United States Patent
Shim (10) Patent No.: US 7,061,551 B2
(45) Date of Patent: Jun. 13, 2006

(54) CONVERGENCE CONTROL APPARATUS AND METHOD FOR COMPENSATING FOR ANGULAR ERROR OF REFERENCE PATTERN

(75) Inventor: Jae-Seung Shim, Seoul (KR)

(73) Assignee: Samsung Electronics Co., Ltd., Kyugki-do (KR)

( * ) Notice: Subject to any disclaimer, the term of this patent is extended or adjusted under 35 U.S.C. 154(b) by 447 days.

(21) Appl. No.: 10/119,748

(22) Filed: Apr. 11, 2002

(65) Prior Publication Data

US 2003/0030757 A1 Feb. 13, 2003

(30) Foreign Application Priority Data

Aug. 9, 2001 (KR) ................ 2001-48070

(51) Int. Cl.
*H04N 3/22* (2006.01)
(52) U.S. Cl. .................. 348/745; 348/747
(58) Field of Classification Search ........... 348/745, 348/747, 189, 190, 807, 806
See application file for complete search history.

(56) References Cited

U.S. PATENT DOCUMENTS

| | | | | |
|---|---|---|---|---|
| 5,576,774 | A | * | 11/1996 | Hosoi et al. ........... 348/745 |
| 6,108,054 | A | * | 8/2000 | Heizmann et al. ...... 348/745 |
| 6,671,004 | B1 | * | 12/2003 | Runtze et al. .......... 348/745 |
| 6,711,597 | B1 | * | 3/2004 | O'Donnell ............. 708/290 |
| 6,836,298 | B1 | * | 12/2004 | Song et al. ............. 348/745 |

FOREIGN PATENT DOCUMENTS

| | | |
|---|---|---|
| DE | 199 26 487 A1 | 12/2000 |
| DE | 199 45 623 A1 | 3/2001 |
| EP | 0 703 714 A2 | 3/1996 |
| JP | 55-99882 | 7/1980 |

* cited by examiner

*Primary Examiner*—Victor R. Kostak
(74) *Attorney, Agent, or Firm*—Sughrue Mion, PLLC

(57) ABSTRACT

Convergence control apparatus of a projection television has: a pattern generator for generating a reference pattern; optical sensors for sensing the change of luminance of the reference pattern moving on a screen; and a convergence controller for compensating for the tilt of the reference pattern based on the output of the optical sensors. The optical sensors are respectively disposed at opposite sides on the screen. The convergence controller detects the angular error of the reference pattern distorted by earth's magnetic field, based on the difference between a standard position and a measured position of a maximum luminance of the reference pattern, and controls a deflection circuit to compensate for the angular error. When the image displayed on the screen is tilted by the influence of the earth's magnetic field, the tilt of the picture can be compensated. After completing the compensation for the angular error, a positional error of CRTs for R, G, and B colors is also compensated. The positional error can be accurately compensated with respect to each CRT, of which the influence of the earth's magnetic field is different from each other.

10 Claims, 7 Drawing Sheets

STANDARD POSITION OF REFERENCE PATTERN AND MEASURED POSITION OF REFERENCE PATTERN AFTER COMPENSATING

US 7,061,551 B2

CONVERGENCE CONTROL APPARATUS AND METHOD FOR COMPENSATING FOR ANGULAR ERROR OF REFERENCE PATTERN

BACKGROUND OF THE INVENTION

1. Field of the Invention

The present invention relates to an apparatus for controlling convergence of a projection television and a method for controlling the same, and more particularly to an apparatus for controlling the convergence capable of compensating for the tilt of image influenced by the earth's magnetic field, and the method for controlling the same. The present application is based on Korean Patent Application No. 2001-48070, filed Aug. 9, 2001, which is incorporated herein by reference.

2. Description of the Related Art

A projection television using a CRT or a liquid crystal display displays an image signal as a visually recognizable picture by projecting colors of R, G, and B (Red, Green, Blue) on a screen. The position of a projecting cathode ray is precisely controlled since the deflection of the cathode ray is adjusted by a magnetic field. Therefore, the deflection degree of the cathode ray is under the direct influence of the magnetic field.

In general, when the projection television is manufactured in a production line, the degree of deflection of the cathode ray is adjusted so that the cathode ray can be precisely projected to a desired position on the CRT screen.

However, the magnitude of the earth's magnetic field at the position where the projected television is installed and used is different from that of the earth's magnetic field at the position of the production line in accordance with a region and a direction. Accordingly, the change of the magnitude of the earth's magnetic field affects the precise forming of the picture of the projection television. In other words, the change of the earth's magnetic field causes a distortion in the deflection degree of the cathode ray, thus the exact picture cannot be formed on the CRT screen. Therefore, the projection television has a built-in circuit for compensating by itself for the influence of the change of the earth's magnetic field, and the compensating circuit is called a convergence control circuit.

Figure 1:
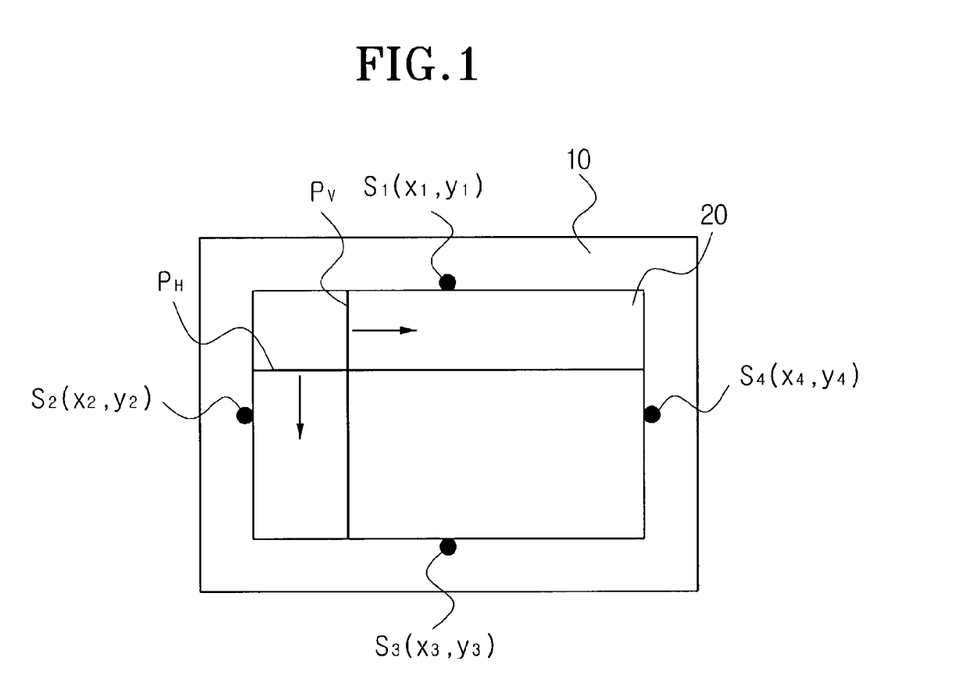
FIG. 1 is a view showing a screen for displaying reference patterns, which are output to compensate for the influence of the earth's magnetic field in a conventional projection television.
Figure 2:
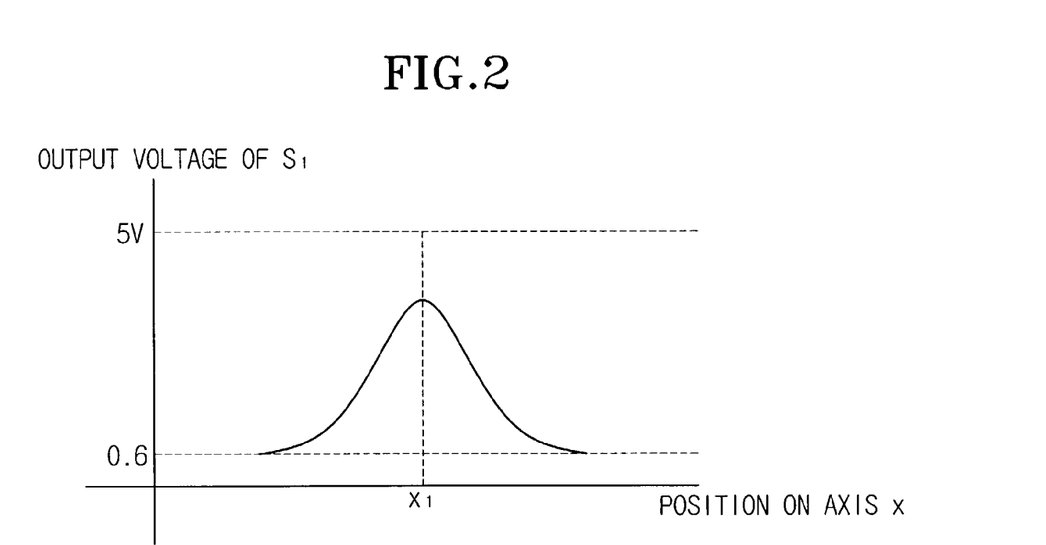
FIG. 2 is a graph showing a voltage that is output from one of the optical sensors shown in FIG. 1 after the convergence control in a production line has been normally performed.
Figure 3:
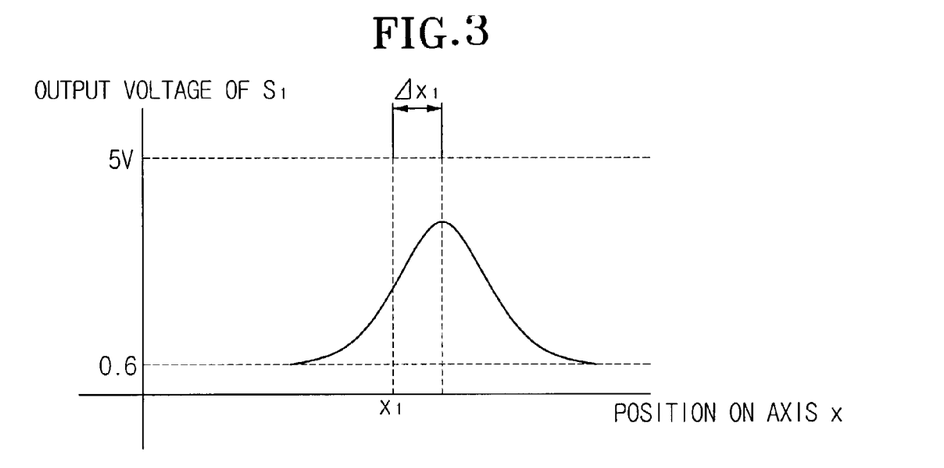
FIG. 3 is a graph showing a voltage that is output from one of the optical sensors shown in FIG. 1 when a picture displayed on the screen is distorted by the earth's magnetic field.

FIGS. 1 through 3 are views for describing a conventional method for controlling the convergence.

As shown in FIG. 1, a screen 20 for displaying the picture formed by the CRT is installed on the front side of a case 10 of the projection television. Predetermined reference patterns $P_H$ and $P_V$ are displayed on the screen 20, and a plurality of optical sensors $S_1$, $S_2$, $S_3$, and $S_4$ are disposed on the case 10.

The reference patterns consist of a horizontal reference pattern $P_H$ displayed as a horizontal line, and a vertical reference pattern $P_V$ displayed as a vertical line. The horizontal reference pattern $P_H$ moves from an upper part of the screen 20 towards a lower part of the screen 20 as indicated by a vertical arrow, and the vertical reference pattern $P_V$ moves from a left part of the screen 20 to a right part of the screen 20 as indicated by a horizontal arrow.

The optical sensors $S_1$, $S_2$, $S_3$, and $S_4$ are each disposed at an upper side, a left side, a lower side, and a right side of the screen 20. Respective positions of the optical sensors $S_1$, $S_2$, $S_3$, and $S_4$, that are (x1, y1), (x2, y2), (x3, y3), and (x4, y4) are recorded in a microprocessor (not shown) installed in the projection television. The optical sensors $S_1$, $S_2$, $S_3$, and $S_4$ measure a luminance of the reference patterns $P_V$ and $P_H$ moving horizontally and vertically, respectively. In this situation, a first sensor $S_1$ and a third sensor $S_3$ measure the luminance of the vertical reference pattern $P_V$, and a second sensor $S_2$ and a fourth sensor $S_4$ measure the luminance of the horizontal reference pattern $P_H$.

FIGS. 2 and 3 show a voltage output from the first optical sensor $S_1$, in other words, a voltage value of the result after measuring the luminance of the vertical reference pattern $P_V$. As shown in FIG. 2, when the convergence is controlled as the magnitude of the earth's magnetic field in the production line is considered, the output voltage of the first optical sensor $S_1$, the result of the measurement of the luminance of the vertical reference pattern $P_V$, has a maximum value at the position of $x_1$ in a horizontal direction. However, as the degree of the influence of the earth's magnetic field is changed by the change of location of the projection television, the position of the reference patterns is somewhat deviated from $x_1$ by an amount $\Delta x_1$ as shown in FIG. 3. Thus the output voltage of the first optical sensor $S_1$ has the maximum value at the position deviated from $x_1$ by $\Delta x_1$ in the horizontal direction. The microprocessor in the projection television uses the changed value to judge the magnitude of the earth's magnetic field, and compensates for the picture distorted for the influence of the earth's magnetic field, on the basis of the judged value. Accordingly, an exact image is formed on the screen of the projection television.

However, according to the conventional convergence control method, only the positional error in the vertical direction and the horizontal direction is compensated as described above, and accurate convergence control is limited. In other words, the horizontal reference pattern $P_H$ and the optical sensors $S_2$ and $S_4$ for measuring the change of the luminance of the horizontal reference pattern $P_H$ can be used only for compensating for the positional error in the vertical direction. The vertical reference pattern $P_V$ and the optical sensors $S_1$ and $S_3$ for measuring the change of the luminance of the vertical reference pattern $P_V$ can be used only for compensating for the positional error in the horizontal direction. Therefore, when the influence of the earth's magnetic field causes distortion in an angular direction, for example, when the vertical reference pattern $P_V$ is displayed tilted at a predetermined angle with respect to the standard position, there is no way to compensate for the tilted picture.

SUMMARY OF THE INVENTION

The present invention has been made to overcome the above-mentioned problems of the related art. Accordingly, it is an object of the present invention to provide a convergence control apparatus and a method of a projection television capable of compensating for a tilted picture on a screen caused by the influence of the earth's magnetic field.

A convergence control apparatus of the projection television to accomplish the object of the present invention comprises: a pattern generator for generating a predetermined reference pattern; a plurality of optical sensors for sensing a change of luminance of the reference pattern moving on the screen; and a convergence controller to compensate for the angular error between a standard position and a measured position of the reference pattern, based on a result output from the optical sensors.

The plurality of optical sensors are disposed at sides respectively corresponding to each other on the screen where the reference patterns are displayed thereon. The convergence controller calculates the angular error of the reference patterns distorted by the earth magnetic field, based on a difference between the standard position of the reference pattern and the measured position of a maximum luminance of the reference pattern, and controls a deflection circuit to compensate for the angular error.

The convergence controller calculates a positional error between the measured position and the standard position of the reference pattern of which the angular error has been compensated, and controls the deflection circuit to compensate for the positional error. The compensation for the positional error is individually performed for each CRT that outputs the colors of R, G, and B of the projection television. The positional error, which has not been completely compensated by the compensation for the angular error for the CRT that is being influenced differently by the earth magnetic field in accordance with the colors, can be accurately compensated.

Preferably, at least two pairs of the optical sensors are respectively disposed at an upper side, a lower side, a left side, and a right side of the screen, and the angular error and the positional error can be compensated for in a horizontal direction and a vertical direction on the screen by the optical sensors.

On the other hand, a method for controlling a convergence of a projection television according to the present invention comprises the steps of: generating a predetermined reference pattern moving on a screen; measuring a variation of a luminance of the reference pattern while the reference pattern is moving; calculating an angular error of the reference pattern distorted by an earth magnetic field, based on a difference of a measured position where a maximum luminance is measured and a standard position of the reference pattern; and calculating compensation data for the angular error to compensate for the angular error.

Here, the angular error calculating step comprises the steps of: calculating two distance differences respectively at two opposite sides of the screen between the standard position and the measured position; calculating an average value of the distance differences; and calculating the angular error using information on the average value and the distance between two sides.

According to the present invention, when an image displayed on the screen is tilted by a predetermined angle by the influence of the earth's magnetic field, the tilt of the picture can be compensated.

BRIEF DESCRIPTION OF THE DRAWINGS

The above-mentioned object and the feature of the present invention will be more apparent by describing the preferred embodiment of the present invention by referring to the appended drawings, in which.

DESCRIPTION OF THE PREFERRED EMBODIMENT

Hereinbelow, the preferred embodiment of the present invention will be described in detail by referring to the appended drawings. In the description of the present invention, reference patterns, a screen on which the reference patterns are displayed, and optical sensors installed on the screen are the same as those of the prior art shown in FIG. 1. Thus, the detailed description of these parts will be omitted and the same reference numerals will be given for the same parts.

Figure 4:
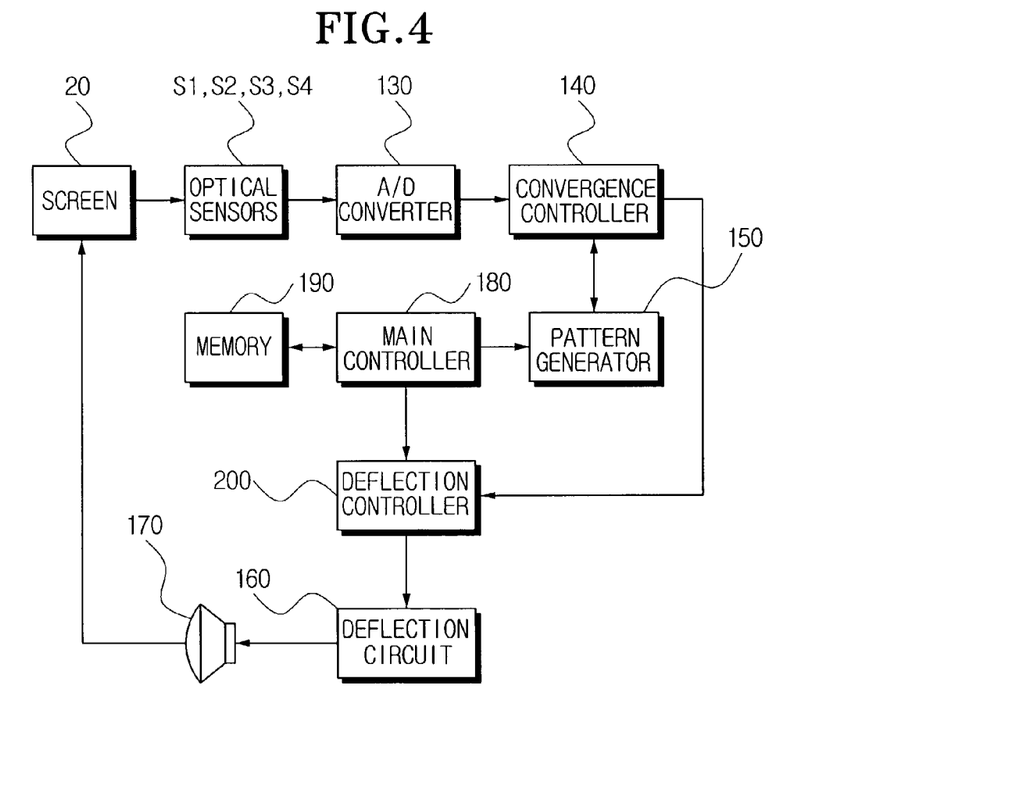
FIG. 4 is a schematic block diagram showing a projection television having an apparatus for controlling a convergence according to the present invention.

FIG. 4 is a schematic block diagram of a projection television having an apparatus for controlling convergence according to the present invention. The projection television has CRTs 170 for forming a picture by reproducing an image signal, a screen 20 for displaying the picture formed by the CRTs 170, and a deflection circuit 160 for controlling the forming of the picture by adjusting a degree of the deflection of a cathode ray of the CRTs 170. The projection television has three CRTs 170 for independently displaying the colors of R, G, and B. The picture formed by each CRT 170 is reflected by a mirror (not shown), and the reflected picture is displayed on the screen 20. The projection television can use not only the CRTs 170 but also a liquid crystal display as an apparatus for displaying an image.

Moreover, the projection television has: a pattern generator 150 for generating reference patterns on the screen 20; optical sensors $S_1$, $S_2$, $S_3$, and $S_4$ for sensing a luminance of the reference patterns formed on the screen 20; an A/D converter 130 for converting an output voltage of the optical sensors $S_1$, $S_2$, $S_3$, and $S_4$ into digital data; a convergence controller 140 for calculating compensation data for controlling the convergence, based on data received from the A/D converter 130; a main controller 180 for controlling the generation of the reference patterns $P_V$ and $P_H$ of the pattern generator 150; a deflection controller 200 for controlling an operation of the deflection circuit 160 in accordance with the control of the main controller 180 and the convergence controller 140; and a memory 190 for storing reference used for calculating the compensation data for the influence of the earth's magnetic field.

As described above, the pattern generator 150 generates the reference patterns used for controlling the convergence. The reference patterns generated by the pattern generator 150 are projected on the screen 20 by the CRTs 170.

The optical sensors $S_1$, $S_2$, $S_3$, and $S_4$ sense the luminance of the reference pattern projected on the screen 20, and output a voltage corresponding to the luminance. The voltage that is output by the optical sensors $S_1$, $S_2$, $S_3$, and $S_4$ is converted into digital data by the A/D converter 130.

The convergence controller 140 detects a position where maximum luminance is measured (hereinafter referred to as a measured position) based on the data of the A/D converter 130. The measured position is a position where the optical sensors $S_1$, $S_2$, $S_3$, and $S_4$ output a maximum voltage, in other words, where the optical sensors $S_1$, $S_2$, $S_3$, and $S_4$ measure that the luminance of the reference patterns $P_H$ and $P_V$ is maximum. A maximum luminance output position of the reference patterns $P_H$ and $P_V$ displayed after completing the control of the convergence on a production line is stored in the memory 190. The maximum luminance output position is a standard position of the reference patterns $P_H$ and $P_V$ (hereinafter referred to as a standard position). The convergence controller 140 calculates the degree of the distortion of the reference patterns caused by the earth's magnetic field by comparing the detected measured position with the standard position, which has been stored in the memory 190. The convergence controller 140 also calculates the data to compensate for the distortion in accordance with the degree of the distortion. The convergence controller 140 controls the deflection circuit 160 to compensate for the influence of the earth's magnetic field that affects the CRTs 170 by controlling a deflection controller 200 in accordance with the compensation data.

From now on, a method for controlling the convergence according to the present invention will be described by referring to FIGS. 5 through 9.

When power is supplied to the projection television, the method for controlling the convergence according to the present invention is performed before a searched broadcasting signal is output on the CRTs 170. The convergence control can be performed when a separate command for starting the convergence control is input from a user.

Figure 5:
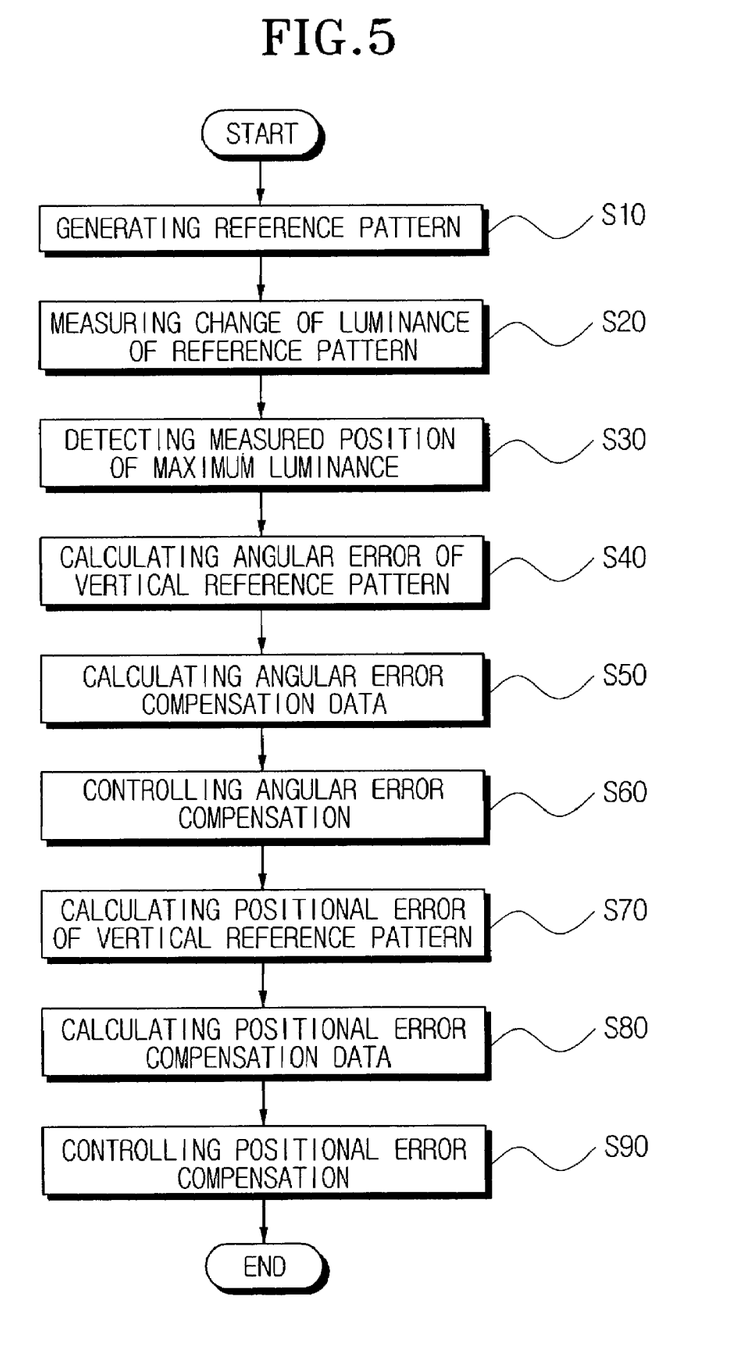
FIG. 5 is a flow chart showing a method for controlling the convergence according to the present invention.

If the convergence control starts, firstly, the main controller 180 drives the pattern generator 150, so as to generate the reference patterns $P_V$ and $P_H$ on the CRTs 170 (S10). The reference patterns $P_V$ and $P_H$ are reflected by the mirror (not shown), and displayed on the screen 20. The reference patterns $P_V$ and $P_H$ move vertically and horizontally on the screen 20, respectively. The vertical reference pattern $P_V$ is used for the horizontal convergence control, and then the horizontal reference pattern $P_H$ is used for the vertical convergence control. The controlling of the vertical convergence and the horizontal convergence can be performed at the same time. FIG. 5 shows the process for controlling the horizontal convergence, and the description is as follows.

Figure 6:
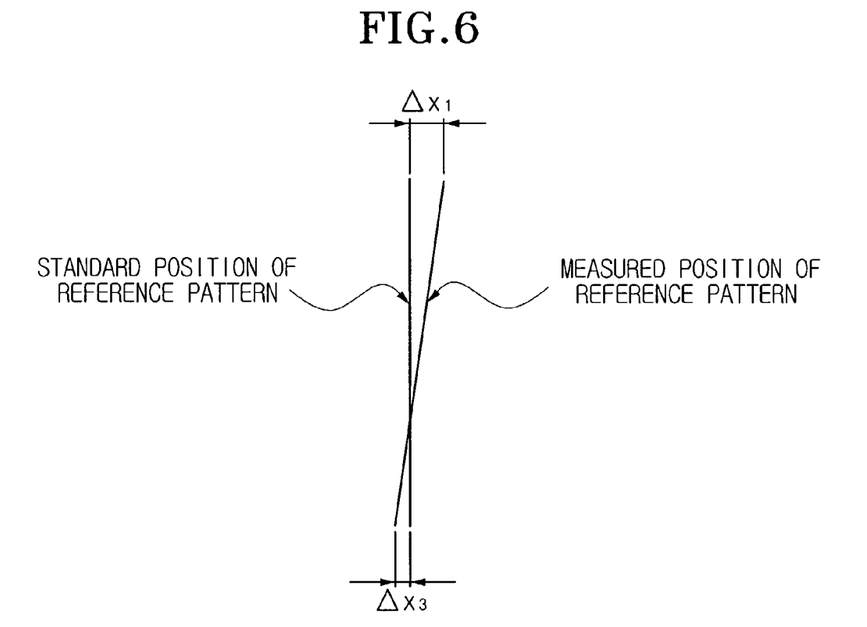
FIGS. 6 through 9 are schematic views consecutively showing the process for compensating for the distortion of the reference patterns by the method for controlling the convergence according to the present invention.

While the vertical reference pattern $P_V$ is moving in the horizontal direction, a first optical sensor $S_1$ and a third optical sensor $S_3$, respectively disposed at an upper side and a lower side facing each other on the screen 20, measure the change of the luminance of the vertical reference pattern $P_V$ in the horizontal direction (S20). Based on the change of the luminance measured by the first optical sensor $S_1$ and the third optical sensor $S_3$, as described above, the measured position that the maximum luminance is output is detected (S30), and the measured position is compared with the standard position stored in the memory 190, and a difference of the distance from the upper side and the difference of the distance from the lower side on the screen 20 are calculated. In other words, since the measured position of the vertical reference pattern $P_V$ is tilted by a predetermined angle with respect to the standard position of the vertical reference pattern $P_V$ because of the influence of the earth's magnetic field, for example, as shown in FIG. 6, the vertical reference pattern $P_V$ virtually displayed on the screen 20 has a distance difference of about $\Delta X_1$ to the right side on the upper side of the screen 20, $\Delta X_3$ to the left side on the lower side of the screen 20 in compensation with the vertical reference pattern $P_V$ on the production line.

The convergence controller 140 calculates the angular error of the vertical reference pattern $P_V$ by using the distance difference $\Delta X_1$ and $\Delta X_3$ (S40), and compensation data to compensate for the calculated angular error (S50). The calculating step of the compensation data will be described next.

Figure 7:
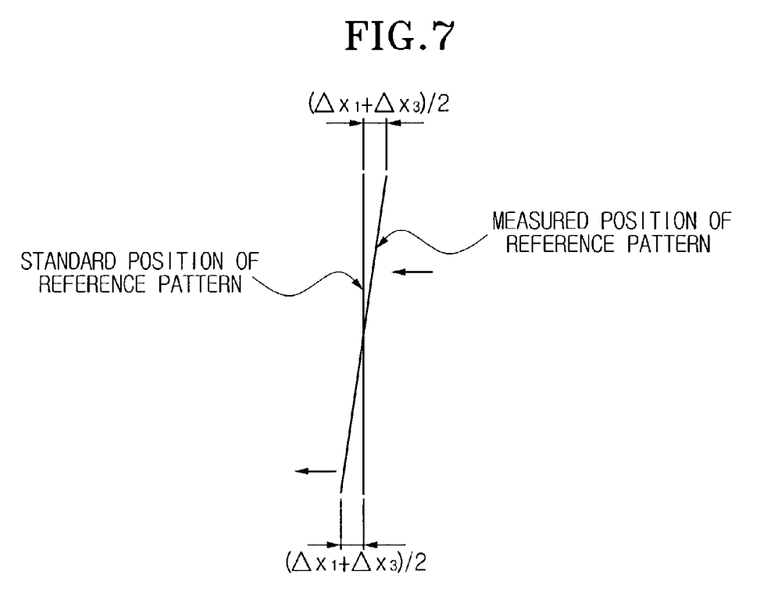

As shown in FIG. 7, the convergence controller 140 calculates the compensation data for controlling the convergence so that the position of the vertical reference pattern $P_V$ virtually displayed on the screen 20 can be an average value, $(\Delta X_1+\Delta X_3)/2$ of the distance difference from the upper side and the lower side of the screen 20. For this end, the convergence controller 140 calculates the compensation data that can deflect the vertical reference pattern $P_V$ to move by $\Delta X_1-(\Delta X_1+\Delta X_3)/2$. For example, in FIG. 6, if $\Delta X_1=3$ and $\Delta X_3=1$, then the average value is $(3+1)/2=2$, and the compensation data is the data that can control the deflection circuit 160 so that the vertical reference pattern PV can move by $3-2=1$.

Figure 8:
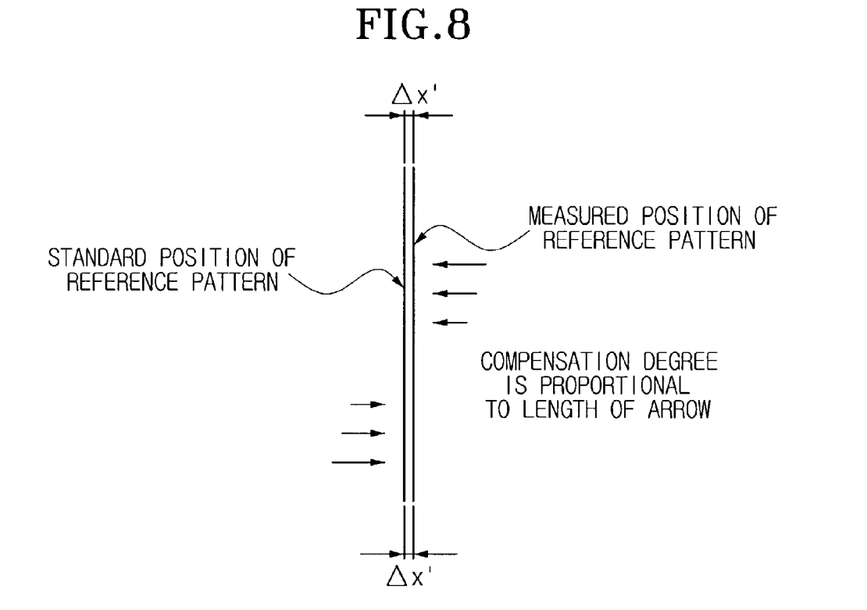

After that, as shown in FIG. 8, the convergence controller 140 calculates the compensation data for the vertical reference pattern Pv to be placed at a position rotated as much as the angular error. For this end, the convergence controller 140 calculates the compensation data so that the degree of the compensation increases in proportion to the distance from a central point in the vertical direction on the screen 20. For example, in FIG. 7, since there is no positional error at a crossing point of the measured position of the reference patterns and the standard position of the reference patterns, the compensation for the distortion is not performed, but the compensation for about the average value, $((\Delta X_1+\Delta X_3)/2)=2$ is performed on the upper side of the screen 20 by increasing the degree of the compensation as it moves from the crossing point to the upper side of the screen 20.

The convergence controller 140 controls the deflection circuit 160 through the deflection controller 200 to compensate for the distortion caused by the earth's magnetic field in accordance with the compensation data calculated from the above method (S60). Accordingly, the vertical reference pattern Pv generated on the screen 20 compensates for the angular error and becomes the status of FIG. 8 from FIG. 7.

In steps S40 and S50, the compensation data to compensate for the angular error is calculated after the calculation of the angular error. However, as a matter of fact, the angular error is compensated without the separate calculating step of the angular error, by calculating the compensation data that compensates the vertical reference pattern Pv to be placed at a position having the average value, $((\Delta X_1+\Delta X_3)/2)$ of each distance difference $(\Delta X_1, \Delta X_3)$ on the upper and the lower side of the screen 20, and that compensates as the degree of the compensation increases in proportion to the distance from the crossing point as described above.

However, as described before, the projection television has three CRTs 170 for respectively outputting R, G, and B colors, and the reference patterns of each color has a different degree of distortion influenced by the earth's magnetic field. Accordingly, as described above, when the angular error is compensated by the same compensation data, the degree of compensation is virtually different for each color. Therefore, after the distortion of the angular error is compensated, as shown in FIG. 8, the position of the vertical reference pattern Pv can have a predetermined positional error ($\Delta X'$) in the horizontal direction for a certain color. The convergence controller 140 calculates the positional error ($\Delta X'$) based on the output value of the optical sensors $S_1$ and $S_3$ (S70), and the compensation data for compensating the positional error ($\Delta X'$) (S80).

Figure 9:
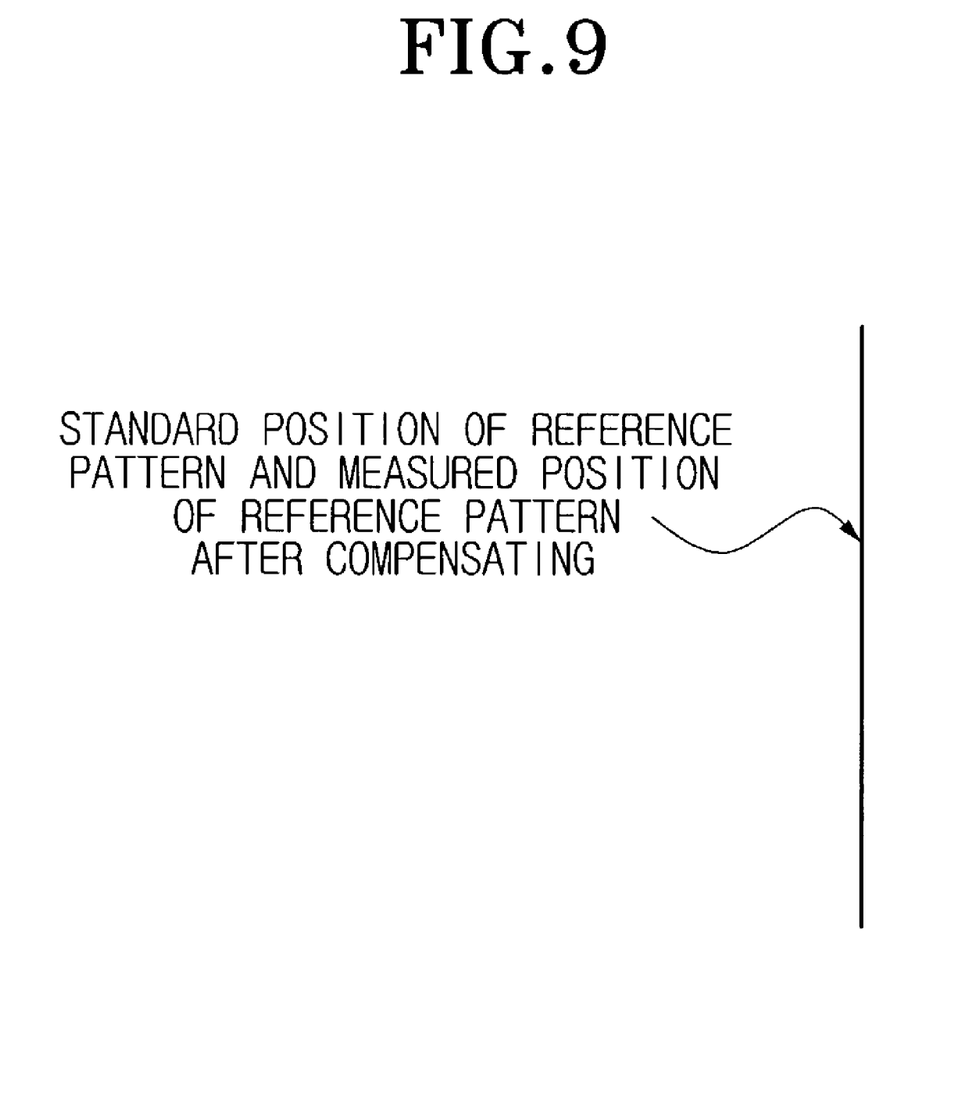

After that, the convergence controller 140 controls the deflection circuit 160 through the deflection controller 200 in accordance with the compensation data to compensate for the positional error ($\Delta X'$). Accordingly, the compensation control of the positional error ($\Delta X'$) is performed (S90), and thus, as shown in FIG. 9, the vertical reference pattern Pv displayed on the screen 20 is in the original position of the vertical reference pattern Pv that had been generated just after the convergence control on the production line. At this time, the compensation for the positional error (ΔX') is individually performed for each color. In other words, the positional error (ΔX') for each of the CRTs 170 for outputting B, R, and G is measured, and also the compensation for the positional error (ΔX') is performed.

In the description of FIGS. 5 through 9, the angular error compensation steps for the vertical reference pattern Pv has been described, but the angular error compensation step for the horizontal reference pattern $P_H$ is performed in accordance with the same steps described before by using second and fourth optical sensors $S_2$ and $S_4$.

According to the present invention, when the picture displayed on the screen is tilted by a predetermined angle by the earth's magnetic field, the tilted picture is compensated. Moreover, when the CRTs are provided for each color, not only the angular error but the positional error can be compensated also. Accordingly, the picture displayed on the screen is clearer.

Although the preferred embodiment of the present invention has been described, it will be understood by those skilled in the art that the present invention should not be limited to the described preferred embodiment, but various changes and modifications can be made within the spirit and the scope of the present invention. Accordingly, the scope of the present invention is not limited within the described range but the following claims.

What is claimed is:

1. A convergence control apparatus of a projection television, comprising:
    a pattern generator for generating a predetermined reference pattern;
    a plurality of optical sensors disposed respectively at a facing side on a screen that the reference pattern is displayed, the optical sensors for sensing a change of a luminance of the reference patterns moving on the screen; and
    a convergence controller configured to calculate an angular error of the reference pattern distorted by an earth magnetic field without input from a user of the projection television, based on a difference of a measured position that a maximum luminance is measured by the optical sensors and a standard position of the reference pattern, and control a deflection circuit to compensate for the angular error.

2. The convergence control apparatus of claim 1, wherein the convergence controller calculates a positional error between the standard position and the measured position of the reference pattern of which the angular error has been compensated, and controls the deflection circuit to compensate for the positional error.

3. The convergence control apparatus of claim 1, wherein at least two pairs of the optical sensors are disposed at an upper side, a lower side, a left side, and a right side of the screen,
    whereby the angular error is calculated with respect to a horizontal direction and a vertical direction on the screen.

4. The convergence control apparatus of claim 2, wherein at least two pairs of the optical sensors are disposed at an upper side, a lower side, a left side, and a right side of the screen,
    whereby the positional error is calculated with respect to a horizontal direction and a vertical direction on the screen.

5. A convergence control method of a projection television, comprising the steps of:
    generating a predetermined reference pattern moving on a screen;
    measuring a variation of a luminance of the reference pattern while the reference pattern is moving;
    calculating an angular error of the reference pattern distorted by an earth magnetic field without input from a user of the projection television, based on a difference of a measured position that a maximum luminance is measured and a standard position of the reference pattern; and
    calculating compensation data for compensating for the angular error.

6. The convergence control method of claim 5, wherein the angular error calculating step comprises the steps of:
    calculating two distance differences respectively at two opposite sides of the screen between the standard position and the measured position;
    calculating an average value of the distance differences; and
    calculating the angular error using information on the average value and a distance between two sides.

7. The convergence control method of claim 5, further comprising the steps of:
    calculating a positional error between the standard position of the reference pattern and the measured position of the reference patterns of which the angular error has been compensated; and
    calculating compensation data for compensating for the positional error.

8. The convergence control method of claim 7, wherein the positional
    error calculating step is individually performed in accordance with colors of a plurality of the reference patterns.

9. The convergence control apparatus according to claim 1, wherein the predetermined reference pattern comprises a single horizontal line and a single vertical line.

10. The convergence control method according to claim 5, wherein the predetermined reference pattern comprises a single horizontal line and a single vertical line.

* * * * *